April 16, 1957 P. C. EFROMSON 2,789,237
ELECTRODYNAMIC VIBRATION TEST EQUIPMENT
Filed Dec. 14, 1954 5 Sheets-Sheet 1

INVENTOR.
Philip C. Efromson
BY George W Price
Attorney

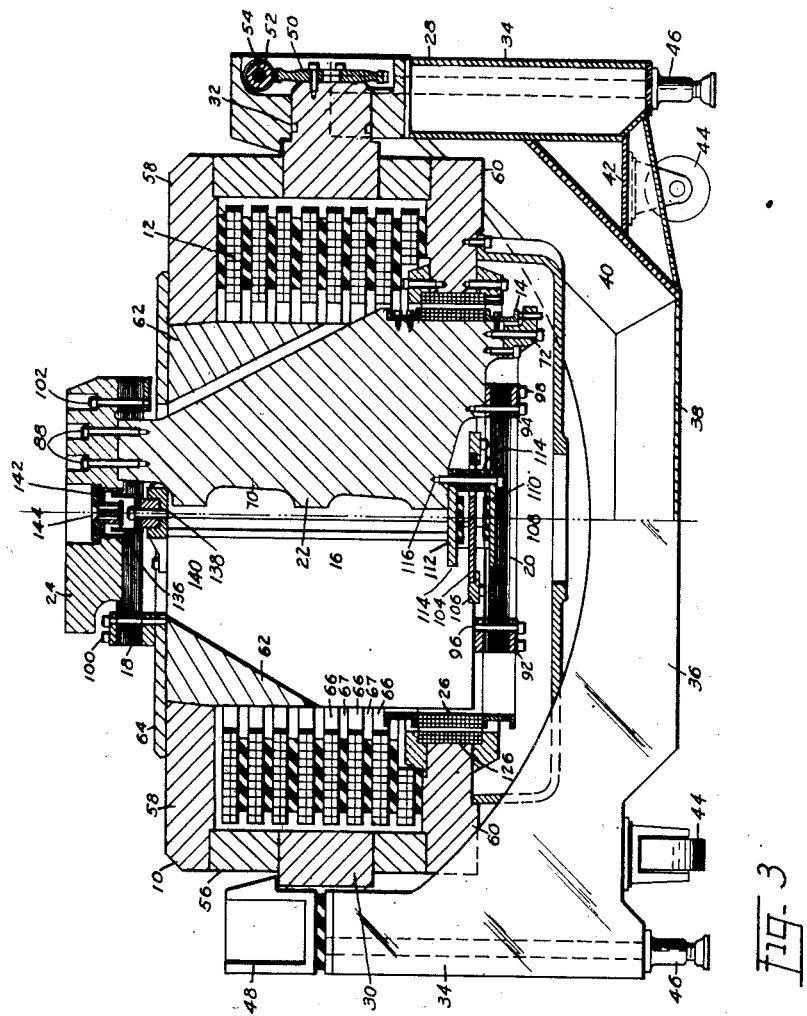

April 16, 1957 P. C. EFROMSON 2,789,237
ELECTRODYNAMIC VIBRATION TEST EQUIPMENT
Filed Dec. 14, 1954 5 Sheets-Sheet 3
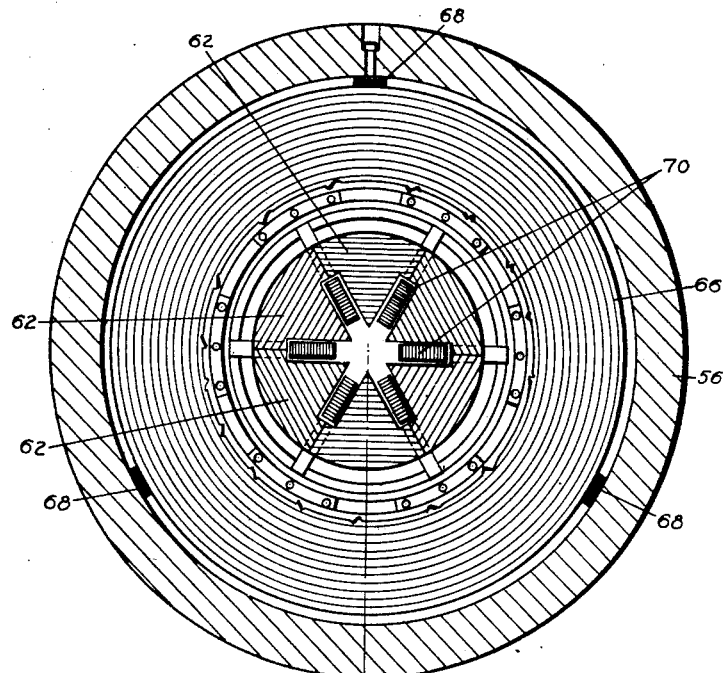
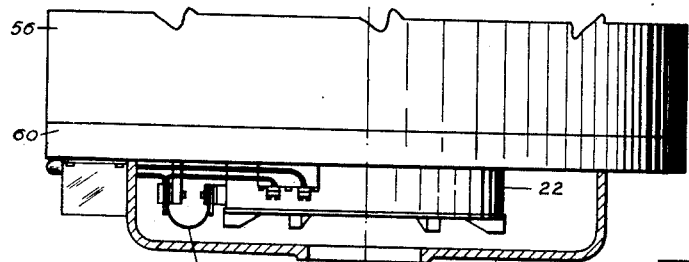
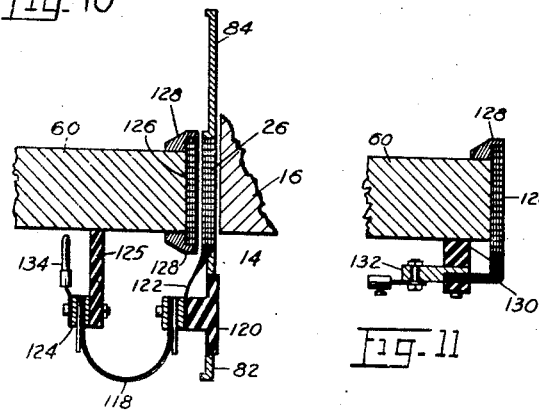
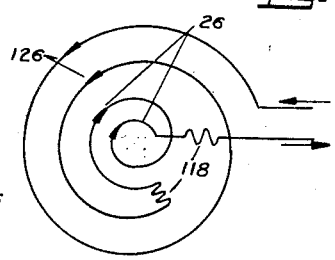
INVENTOR.
Philip C. Efromson
BY George W Price
Attorney

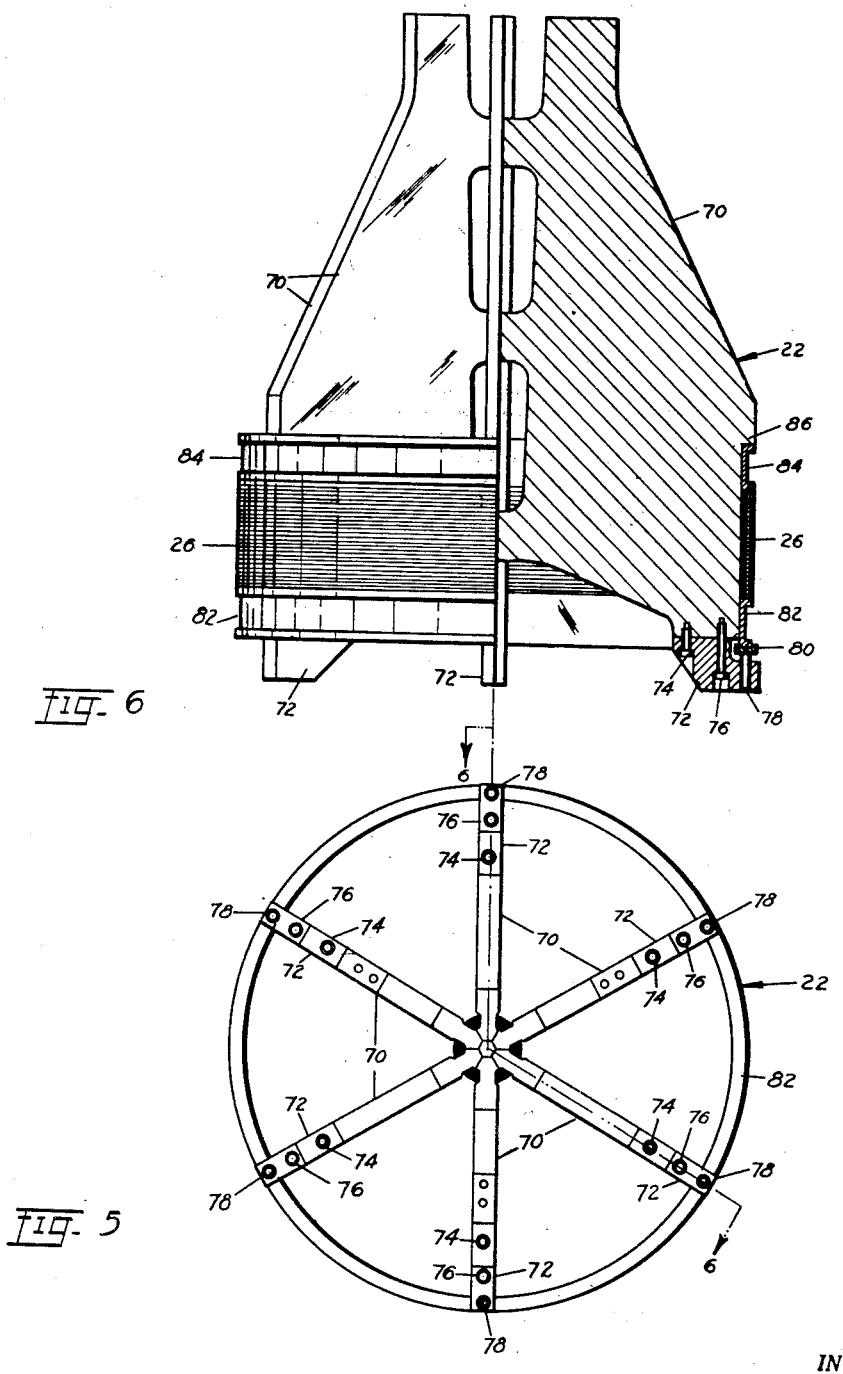

April 16, 1957 P. C. EFROMSON 2,789,237
ELECTRODYNAMIC VIBRATION TEST EQUIPMENT
Filed Dec. 14, 1954 5 Sheets-Sheet 5
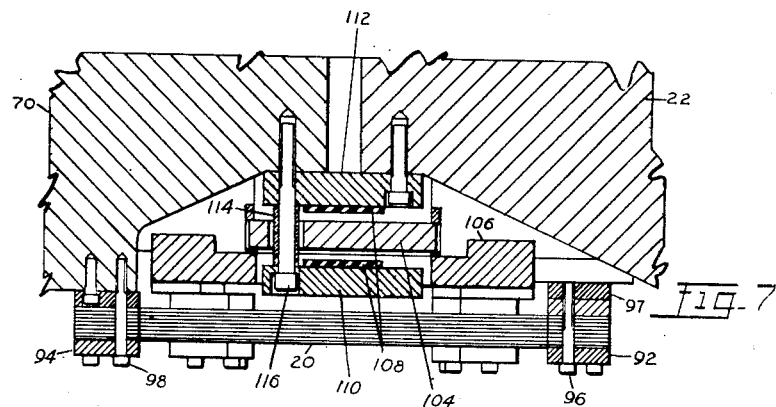
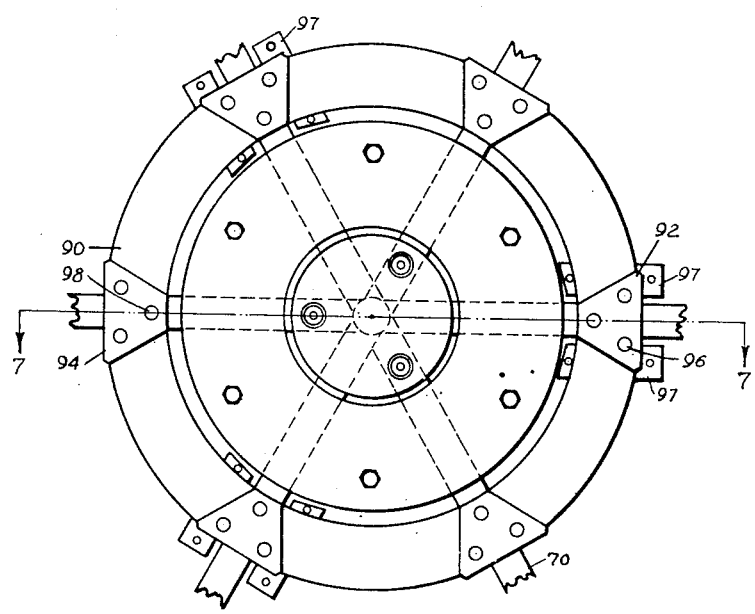
INVENTOR.
Philip C. Efromson
BY George W Price
Attorney United States Patent Office 2,789,237
Patented Apr. 16, 1957

2,789,237

ELECTRODYNAMIC VIBRATION TEST EQUIPMENT

Philip C. Efromson, Winchester, Mass., assignor to The Calidyne Company, Winchester, Mass., a copartnership Application December 14, 1954, Serial No. 475,230

13 Claims. (Cl. 310—27)

This invention relates to vibration test equipment and more particularly to electrodynamic apparatus such as are commonly termed "shakers."

As was described in detail in United States Letters Patent No. 2,599,036 to Efromson and Lewis, there are structural and operating advantages to be gained by positioning the armature coil and the test load upon opposite ends of the core structure so that the iron in the structure minimizes the leakage flux from the air gap which reaches the vicinity of the test load. In the aforementioned patent the armature coil is connected to the test load carrying table by a plurality of elongated struts which pass through suitable apertures in the iron portion of the core structure. Such a construction has proven very satisfactory for use in medium to large sized shakers, but in the largest shakers it has been found difficult to obtain a rigid enough armature assembly without excessive weight.

Accordingly the objects of this invention are to provide electrodynamic vibration test apparatus which can be manufactured in very large sizes, which has a very rigid armature assembly, which permits the armature coil and test load to be positioned upon the opposite ends of the core structure, which has a new and improved suspension for the armature assembly and which advances the art generally.

Electrodynamic vibration test equipment according to the present invention comprises a magnetic circuit which includes a core structure having an annular cavity where is enclosed a direct current magnetizing winding. One end of a central pole piece is connected to one end of the core structure with the other end of the pole piece projecting into a circular aperture in the opposite end of the core structure so that the aperture wall and the periphery of the pole piece form the faces of a cylindrical air gap. Disposed within the air gap is an armature coil which is carried upon the ends of a plurality of longitudinally disposed web members of an armature assembly. The web members, which have load coupling means such as a test table upon their opposite ends, are radially disposed so as to engage radial slots which extend outwardly from an axial aperture through the central pole piece. The armature assembly is supported by means of flexures located at either end so that the assembly has freedom of movement in an axial direction but is restrained radially. The flexures each preferably comprise one or more annular members whose radial dimension is several or more times their axial thickness. The annular members are stacked face to face with their axes coinciding with the longitudinal axis of the armature assembly to which the members are attached by three or more equally spaced movable clamping members. Each clamping member preferably includes a pair of blocks one of which is located upon either side of the stack of annular members. A corresponding number of similar stationary clamping members, which are secured to the core structure, are attached respectively to the annular members at positions midway between adjacent movable members so that the portions of the annular members between each stationary clamping member and the adjacent movable clamping members act as supporting cantilevers as the armature assembly is moved axially with respect to the core structure.

These and other objects and aspects will be apparent from the following description of a specific embodiment of the invention which refers to drawings wherein:

Fig. 3 is a sectional view on line 3—3 of Fig. 1 with one of the pole piece segments in elevation;

Fig. 4 is a sectional view transverse to the longitudinal axis;

Fig. 5 is a bottom view of the armature assembly;

Fig. 6 is a partial sectional view on line 5—5 of Fig. 5;

Figs. 7 and 8 are fragmentary views showing the details of the lower flexure and stop plate;

Figs. 9, 10 and 11 are fragmentary views showing the details of the electrical connections to the armature and compensating coils; and Fig. 12 is a wiring diagram of the interconnection of the armature and compensating coils.

Figure 1:
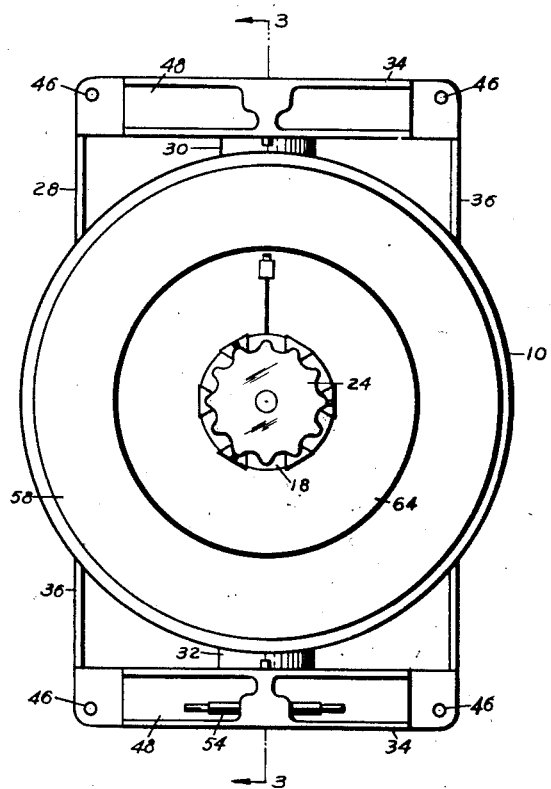
Fig. 1 is a plan view.
Figure 2:
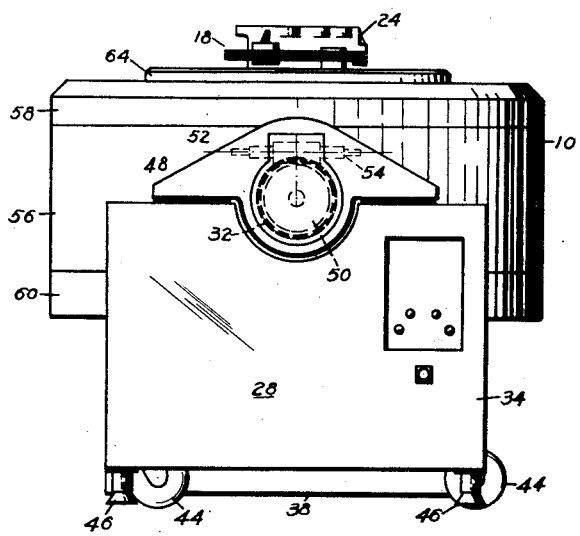
Fig. 2 is an end elevation view.

Referring to Fig. 3, the large shaker illustrated comprises a core structure 10 wherein is enclosed a direct current magnetizing winding 12 which establishes a magnetic flux across a cylindrical air gap 14 between the lower end of the core structure and the periphery of the end of a central pole piece 16 completing the magnetic circuit. Reciprocally mounted within an axial aperture in the central pole piece 16 by means of ring flexures 18 and 20 is an armature assembly 22 having means at one end, such as the table 24, for coupling the assembly to a test load (not shown). An armature coil 26 is secured at the other end of the assembly where the coil is located in the air gap 14. The above elements are carried in a supporting cradle 28 by means of trunnions 30 and 32 which attach to the opposed sides of the core structure 10.

As is best shown in Fig. 3, the cradle 28 is preferably a welded assembly comprising two spaced box-like pedestals 34 that are joined by two side plates 36 which also form the end plates for the pedestals. A bottom plate 38 is welded between the bottom edges of the two side plates 36 and the cradle assembly is further reenforced by two transverse web members 40 which are angularly disposed between the bottom plate and the inner plates of the respective pedestals 34. A horizontal plate 42 is welded between the bottom edge of the inner plate of each pedestal 34 and an intermediate point on the adjacent web member 40 thereby to provide platforms to which are bolted heavy duty casters 44 preferably of the swivel type to permit the shaker to be moved about more easily. At the four corners of the cradle 28 are provided jack screws 46 whereby the shaker is lifted from its casters 44 and leveled before operation.

The bearings for the trunnions 30 and 32 are formed by boring two bearing caps 48 each of which is preferably cast as one piece. The caps 48 are carried on the recessed tops of pedestals 34 so that the weight of the core structure 10, the magnetizing coil 12 and the armature assembly 22 is transmitted through the pedestals to the jack screws 46. The end of the trunnion 32 has an axially extending hub to which is attached a gear 50. Mating with the gear 50 is a worm 52 carried upon a shaft 54 journalled in a boss at the top of the associated bearing cap 48. The ends of the shaft 54 are adapted to engage a manually operated crank (not shown) whereby the core structure 10 can be rotated about the horizontal axis of the trunnions 30 and 32.

The inner ends of the trunnions 30 and 32 are secured in diametrically opposed recesses in a cylindrical shell 56 of a low magnetic reluctance material which forms the outer wall of the core structure 10. The upper and bottom edges of the shell 56 are machined to engage rabbets cut in the inner faces of two circular end pieces 58 and 60. The magnetic circuit is completed through the central pole piece 16 which, as is best shown in Fig. 4, is made up of six segments 62 of generally triangular cross section. The sides of each segment 62 that meet to form the apex thereof are recessed so that upon bringing the sides of the segments into abutting relationship the resulting pole piece 16 has an axially disposed aperture from which radially extend six slots, half of each slot being formed respectively in each of two abutting segments. As is shown in Fig. 3, each of the slots tapers outwardly in a longitudinal direction for reasons which will appear hereinafter. The upper end of the pole piece 16 formed by the segments 62 is secured in an aperture in the upper end piece 58 by an overlying circular plate 64. The corresponding aperture in the lower end piece 60 is of a greater diameter than that of the pole piece so that there is clearance therebetween forming the cylindrical air gap 14 mentioned heretofore. The direct current coil 12, which establishes the unidirectional magnetic flux in the magnetic circuit and across the air gap 14, is located in the annular cavity formed by the shell 56 and end pieces 58 and 60 where it surrounds the central pole so that the leakage flux is minimized. The coil 12 is preferably wound in a plurality of pancake portions 66 which are separated by non-magnetic spacers 67 so that cooling air can be circulated therebetween. The radial position of the coil 12 is maintained by spacers 68 (Fig. 4).

The details of the armature assembly 22 are shown in Figs. 5 and 6. The innermost longitudinal edges of six web members 70 are chamfered and the beveled surfaces of each web member brought into abutting contact with the corresponding surfaces of the two adjoining members so that web members extend in an equally spaced radial arrangement from a common central longitudinal axis. At the lower end of each of the web members 70 is located a respective clamp member 72 which is attached to the correlated member by two bolts 74 and 76. The outwardly projecting finger-like end of each of the clamp members 72 is provided with a threaded aperture for engaging the external threads of a respective set screw 78. The ends of the set screws 78 bear against respective spacer blocks 80 which are slotted to engage the lower flange of a channel shaped member 82. The channel shaped member 82 is in the form of a ring enclosing the vertical portions of the outer edges of the web members 70 with its top flange abutting the lower edge of the armature coil 26. Resting upon the upper edge of the armature coil 26 is a second channel shaped member 84 whose upper flanges engage shoulders 86 cut in the outer edges of the web members 70 so that tightening the set screws 78 compresses the coil between the members 82 and 84 to hold it securely in position.

As is shown in Fig. 3, the armature assembly 22 is positioned in the aperture in the central pole piece 16 with the web members 70 in the slots extending radially from the aperture, the taper on the web members conforming with that of the slots so that the load carrying table 24, which is fastened to the upper ends of the web members 70 by means of bolts 88, projects above the top of the plate 64. The armature coil 26 is of conducting material such as copper or aluminum and the other structural elements of the above described armature assembly 22, are of a non-magnetic material, preferably with a relatively low specific gravity such as aluminum, so that the weight of the assembly is kept to a minimum. The web members 70 are tapered above the shoulders 86 to eliminate excess material; and can, if desired, have interior cutway portions to further reduce their weight. The slots in the central pole piece 16 are tapered to conform with the taper angle of the web members so as to minimize the reduction of iron in the magnetic circuit due to the aperture in the pole piece.

As mentioned heretofore, the armature assembly 22 is supported by means of two flexures 18 and 20 located respectively at either end thereof. As is shown in Figs. 7 and 8, the lower flexure 20 comprises several annular members such as the rings 90, which are of a resilient material such as a suitable bronze, tempered steel or laminated glass phenolic. The radial width of each of the rings 90 is at least several times as great as its axial length so that its stiffness in a radial direction is materially greater than the axial stiffness. The rings 90 are stacked in face-to-face relationship between a plurality of equally spaced clamping members designated 92 and 94 each of which includes a pair of blocks located upon either end of the stacked rings 90. Each of the clamping members has three sets of apertures which are aligned with corresponding apertures through the rings 90. Bolts 96 pass through the aligned apertures in the stationary clamping blocks 92 to engage threaded apertures in spacer blocks 97 adapted to bridge across slots in core piece 16, blocks 97 being in turn bolted to the bottom surface of the central core piece 16. Similar bolts 98 pass through the apertures in the movable clamping blocks 94 to engage threaded apertures in the face of pads machined on the bottom ends of alternate web members 70 of the armature assembly 22.

It is to be noted that the edges of the clamping blocks do not extend radially from the center axis of the rings 90 but the confronting edges of adjacent blocks are made parallel and if extended would be upon a chord not a diameter of the circle of the rings. With the parallel arrangement of confronting edges, the chordal distance between the edges is the same irrespective of the radial distance from the axis of the rings 90. As the armature assembly 22 is moved axially with respect to the core structure 10, the portions of each of the rings between adjacent blocks act as complex, continuous beams each of which deflects in a manner analogous to two cantilevers whose free ends are joined.

The upper flexure 18 is generally similar to the flexure 20 described above, the stationary clamping members being secured to the plate 64 by means of bolts 100. One block of each of the movable clamping members of the flexure 18 is made integral with the bottom of the table 24, the attaching bolt 102 passing through an aperture in the table to engage a threaded aperture in the other block.

To limit the axial travel of the armature assembly 22 with respect to the core structure 10 so that the elastic limit of the flexures 18 and 20 is not exceeded, a stop plate 104 is secured to the end of the central pole piece by clamps 106. On either side of the stop plate 104 are located striker plates 108 which are secured to backing members 110 and 112 respectively. The backing members are separated by spacers 114 through which pass bolts 116 attaching the members of the bottom edges of the web members 70 of the armature assembly 22 so that the travel of the assembly is limited in either direction by the contact of one or the other of the striker plates 108 with the stop plate 104.

The armature coil 26 is connected with an external alternating power supply (not shown) by means of resilient strips 118 of an electrically conducting material the ends of which are bent back parallel to one another as shown in Fig. 10. One end of each of the strips 118 is secured to a terminal block 120 which is carried upon the lower channel shaped member 82 of the armature assembly 22. Leads 122 from the ends of the armature coil 26 are brought to the terminal block 120 and electrically interconnected with the strips 118. The other end of each strip 118 is secured to a terminal block 124 which is attached to the core structure by means of a spacing member 125. As the armature assembly 22 moves axially with respect to the core structure 10, the bend in the flexible strip progressively takes place at successive points intermediate the ends thereof as is described in detail and claimed in patent application Serial No. 427,-131 of Philip C. Efromson, filed May 3, 1954, so that a substantially friction free connection without sliding electrical contact surfaces is made to the moving armature coil 26.

The armature coil 26 is connected in series with a relatively stationary compensating coil 126 which is secured on the face of the end piece 60 of the core structure 10 by clamp rings 128 where the compensating coil is in the air gap 14 in the same flux path as the armature coil 26. The leads 130 (Fig. 11) from the ends of the compensating coil are brought to terminals 132 which by means of leads such as 134 (Fig. 10) permit the compensating coil 126 to be connected in series opposition with the armature coil 26 across the terminals of an external power supply (not shown) so that the instantaneous current flow in the two coils is in the opposite direction as indicated by the arrows in Fig. 12.

The coil 136 of a signal generator, which is used to obtain an indication of the velocity amplitude of the movement of the table 24, is attached by a bolt 138 to a spider 140 mounted on the top of the central pole piece 16 so that the coil is stationary relatively to the pole piece 16. The relatively movable magnetic structure 142 of the signal generator is attached to the table 24 by a bolt 144 so that movement of the armature assembly 22 causes the turns of the coil 136 to cut the flux across the gap of the magnetic structure 142 inducing an electrical potential in the coil.

In operation the shaker is elevated from the castors 44 by means of jack screws 46 and the test load attached to or otherwise coupled with the table 24. The direct current coil 12 is energized from a source of direct current such as a motor generator set (not shown) whereby a unidirectional magnetic flux is established across the air gap 14 of the magnetic circuit 10. An alternating current is applied to the armature coil 26 and the compensating coil 126, for example from a variable speed alternator, whereby the interaction of the unidirectional and alternating fields cause the armature assembly 22 to reciprocate in an axial direction at a frequency corresponding to that of the alternator. The compensating coil 126 may also be used without interconnecting with the armature coil 26, by shorting the end connections of coil together, and impressing the alternating current directly on the armature coil 26 through the strips 118, in which case compensation is obtained by induction.

I claim:

1. Electrodynamic vibration test apparatus for imparting a reciprocating movement to a coupled load comprising a low reluctance magnetic circuit including a core structure having an annular cavity wherein is disposed a direct current winding and a central pole piece connected to the core structure at one end and having a peripheral portion which is separated therefrom to form a cylindrical air gap having a unidirectional magnetix flux thereacross, the central pole piece having an axially disposed aperture from which outwardly extend a plurality of slots; an armature assembly including a plurality of longitudinal web members which are disposed radially within the respective aperture slots, means at one end of the web members for connecting the armature assembly to the test load and an alternating current coil secured to the outer edges of the web members where it is located in the air gap; and flexure means for supporting the armature assembly with freedom of movement in an axial direction while restraining the assembly in a radial direction.

2. Electrodynamic vibration test apparatus according to claim 1 wherein the load connecting means includes a table attached to the upper ends of the web members.

3. Electrodynamic vibration test apparatus according to claim 2 wherein the maximum dimension of the table normal to the axis of the armature assembly is less than the diameter of the armature coil and the outer edges of the web members are tapered accordingly to minimize the weight of the assembly.

4. Electrodynamic vibration test apparatus according to claim 3 wherein the aperture slots in the central pole piece are tapered longitudinally to correspond to the configuration of the outer edges of the web members.

5. Electrodynamic vibration test apparatus according to claim 1 wherein the core structure includes a cylindrical outer shell whose ends are closed by circular end pieces to one of which the central pole piece is attached, the opposite end piece having a central aperture into which the end of the pole piece projects so that the wall of the aperture and the outer periphery of the pole piece form the faces of the air gap.

6. Electrodynamic vibration test apparatus according to claim 5 wherein a compensating coil is attached to one of the faces of the air gap.

7. Electrodynamic vibration test apparatus according to claim 6 wherein at least one of the turns of the compensating coil is electrically connected in series with the armature coil.

8. Electrodynamic vibration test apparatus according to claim 1 wherein the central pole piece comprises a plurality of segment shaped elements which are longitudinally recessed to form the pole piece aperture slots.

9. For supporting the armature assembly of electrodynamic vibration test apparatus with freedom of movement in an axial direction while restraining the assembly in a radial direction relative to an associated core structure, flexure means including an annular member of a resilient material whose width in a radial direction is greater than its thickness in an axial direction, a plurality of stationary clamping members attached directly to portions of the annular member at equally spaced positions thereabout, the clamping members also being secured to the core structure for maintaining the clamped portions of the annular member fixed with respect to the core structure, and a corresponding number of movable clamping members each of which is attached respectively to the annular member midway between two adjacent stationary clamping members, the movable clamping members also being secured to the armature assembly whereby the portion of the annular member interposed between each stationary clamping member and the adjacent movable clamping member acts as a supporting double cantilever as the armature assembly is moved axially with respect to the core structure.

10. Flexure means according to claim 9 wherein each of the clamping members includes a pair of blocks which are located respectively upon either side of the annular member.

11. Flexure means according to claim 10 wherein a plurality of annular members are stacked face to face in axial arrangement between each pair of blocks.

12. Flexure means according to claim 11 wherein the annular members and blocks of each pair have one or more sets of aligned apertures therein, and a bolt passes through each set of aligned apertures to engage a correlated aperture in either the armature assembly or the core structure.

13. Flexure means according to claim 10 wherein the opposite edges of the blocks of each stationary clamping member are parallel with the respective confronting edges of the blocks of the adjacent movable clamping members located on either side of said stationary clamping member whereby the chordal distance between the edges of adjacent blocks is the same at all radial distances from the center of the annular member.

References Cited in the file of this patent

UNITED STATES PATENTS 2,675,533  Brown ---------------- Apr. 13, 1954